(12) United States Patent
Oue et al.

(10) Patent No.: US 8,140,050 B2
(45) Date of Patent: Mar. 20, 2012

(54) PORTABLE WIRELESS TERMINAL AND WIRELESS COMMUNICATION METHOD

(75) Inventors: Yukari Oue, Daito (JP); Haruyoshi Oshinome, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/001,047

(22) Filed: Feb. 23, 2011

(65) Prior Publication Data

US 2011/0143706 A1    Jun. 16, 2011

(30) Foreign Application Priority Data

Jun. 26, 2008  (JP) ................................. 2008-167323

(51) Int. Cl.
 *H04M 11/04* (2006.01)
(52) U.S. Cl. .. 455/404.1; 455/567; 342/28; 250/231.13; 340/690
(58) Field of Classification Search ............... 455/404.1, 455/567; 342/28, 27, 82–88; 250/231.13
See application file for complete search history.

(56) References Cited

U.S. PATENT DOCUMENTS

| 2,426,716 | A | * | 9/1947 | Degidon | ........................... 54/36 |
| 6,226,536 | B1 | * | 5/2001 | Miyashita | ..................... 455/567 |

FOREIGN PATENT DOCUMENTS

| JP | 2000-295370 A | 10/2000 |
| JP | 2001-237927 A | 8/2001 |
| JP | 2003-078590 A | 3/2003 |
| JP | 2004-023475 A | 1/2004 |
| JP | 2005-117900 A | 4/2005 |
| JP | 2005-289600 A | 10/2005 |
| JP | 2008-039561 A | 2/2008 |
| JP | 2008-085437 A | 4/2008 |

OTHER PUBLICATIONS

International Search Report dated Jun. 2, 2009 issued by the Japanese Patent Office for International Application No. PCT/JP2009/056170.

* cited by examiner

*Primary Examiner* — Phuoc Doan
(74) *Attorney, Agent, or Firm* — Procopio, Cory, Hargreaves & Savitch LLP

(57) ABSTRACT

It is an aim of the present invention to easily transmit a user's critical state with certainty by an intuitive operation which is not difficult to operate while being able to avoid incorrect activations. A portable wireless terminal (110) of the present invention includes a vibration detection part (226) which detects a vibration of the portable wireless terminal and obtains a vibration value, a vibration amount judgment part (230) which judges whether a vibration amount calculated based on the detected vibration value and the time during which the vibration value exceeds a predetermined vibration value has reached a predetermined threshold, and a transmission part (232) which transmits to the contact destination terminal registered in the portable wireless terminal in the case where the vibration amount is judged to have reached the predetermined threshold.

9 Claims, 8 Drawing Sheets

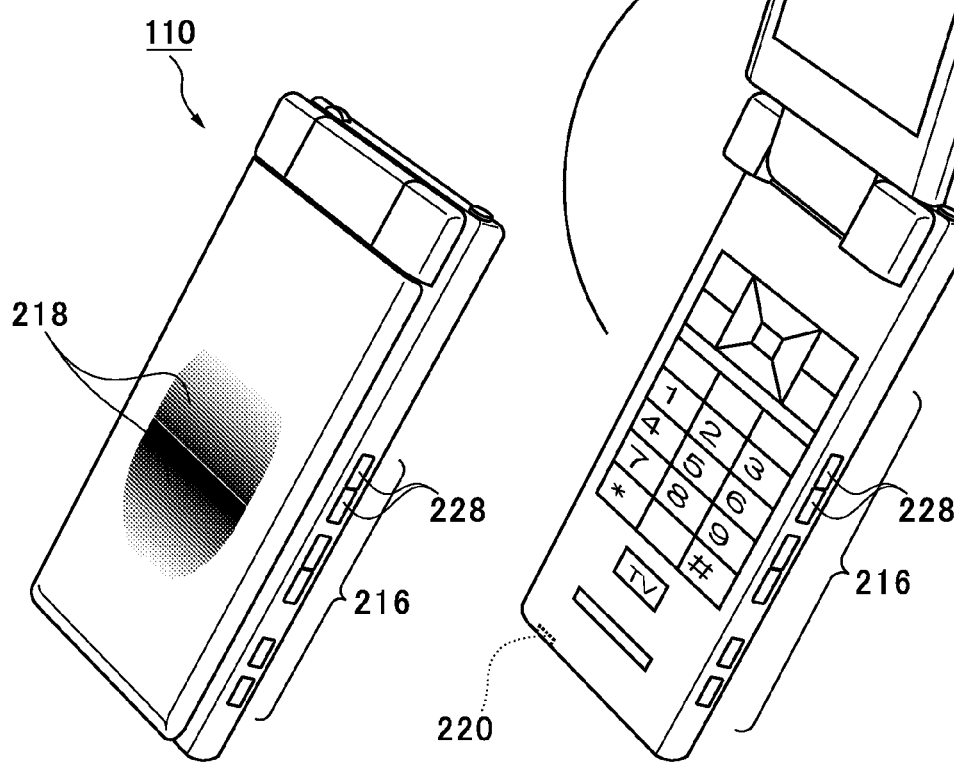

PORTABLE WIRELESS TERMINAL AND WIRELESS COMMUNICATION METHOD

The present invention relates to a portable wireless terminal and wireless communication method which can display a plurality of screens.

BACKGROUND OF THE INVENTION

Field of the Invention

In recent years, incidents in which women and children are exposed to danger occur frequently and crime prevention devices which should avoid such incidents are attracting attention. However, bulky crime prevention devices often lack versatility and are not useful when the need arises. Thus, installing these types of crime prevention devices in portable wireless terminals such as a mobile phone or PHS (Personal Handy Phone System) which a large percentage of people now own is attracting attention.

For example, a technology for restricting a phone number input function and providing an incoming call function and outgoing call function only to a specific person is disclosed in Patent Document 1. In Patent Document 1, it is possible to protect children in safety without the worry of phone bills using this technology. However, in the case of a portable wireless terminal designed for infants, while crime prevention is possible by simple operations such as pressing a special button or removing a special key from the terminal, these crime prevention functions are often accidentally activated.

In other portable wireless terminals a warning sound is emitted by long pressing certain movable operation keys. However, this function is often arranged, for example, on an operation part to be hidden by folding a folding type portable wireless terminal to control accidental activation. In addition, a technology is known in which in the case where an abnormality is felt, the linked portable phone is automatically called by shaking the terminal in a fixed pattern (of shaking action) and the abnormal state of the terminal is transmitted to the portable phone (patent document 1 for example). However, this technology also requires remembering a shaking action of a fixed pattern and can not be used instantly in times of emergency.

Patent Document 1: Japanese Laid Open Patent 2003-078590
Patent Document 2: Japanese Laid Open Patent 2000-295370

DISCLOSURE OF THE INVENTION

Problems to be Solved by the Invention

In order to avoid an accidental activation, this type of crime prevention device must be arranged so that it is not shifted to an emergency mode just by a simple operation. However, if operation difficulty is increased or if it is necessary to input a certain operation pattern, these functions can not sufficiently work during an emergency situation.

It is an aim of the present invention to solve these problems by providing a portable wireless terminal and wireless communication method which can easily transmit its own critical state with certainty by an intuitive operation which is not difficult to operate while being able to avoid incorrect activations.

Means for Solving the Problems

In order to solve the problems described above, a representative structure of a portable wireless terminal related to the present invention is a portable wireless terminal which can establish communication with a contact destination terminal via a base station and which includes a vibration detection part which detects a vibration of the portable wireless terminal and obtains a vibration value, a vibration amount judgment part which judges whether or not a vibration amount calculated based on the detected vibration value and the time during which the vibration value exceeds a predetermined vibration value has reached a predetermined threshold, and a transmission part which transmits to the contact destination terminal registered in the portable wireless terminal in the case where the vibration amount is judged to have reached the predetermined threshold. Here the word "transmission" indicates a data transfer opportunity which includes outgoing voice calls or transmission of electronic mail.

Here, it is possible to transmit a critical state of a user to the contact destination terminal by the vibration of the portable wireless terminal, that is, when the user shakes the portable wireless terminal. However, merely detecting a vibration may cause incorrect activation even by the vibration of a train or bus, and even if a threshold to set on the vibration value in order to solve the above described problems, the portable wireless terminal reacts to a sudden vibration value caused by dropping the portable wireless terminal. In the present invention, a vibration amount calculated based on the detected vibration value and the time during which the vibration value exceeds a predetermined vibration value, that is, it is possible to securely and easily transmit the critical state of a user by an intuitive operation which is not difficult while being nonrandom to the extent of being able to avoid incorrect activation such as shaking vigorously for a few seconds.

The portable wireless terminal may further comprise an alarm part which notifies by a luminescent color or voice the degree of attainment, to the predetermined threshold, of the vibration amount in the vibration amount judgment part.

In the present invention, it is possible to understand the degree of attainment from the start of vibration until the vibration amount reaches a predetermined threshold by a luminescent color or voice while the portable wireless terminal is being shaken. Therefore, it is possible not only to determine whether the threshold of the vibration amount has been reached but it is also possible to predict during vibration how much vibration is required until the threshold is reached and adjust the vibration strength based on the degree of criticality. In addition, it is also possible to easily understand with certainty the degree of attainment not by characters or the number of times a light blinks but by an alarm part which can recognize luminescent color or voice while vibrating.

The portable wireless terminal may further comprise an operation part arranged with a plurality of movable operation keys, and the vibration amount judgment part judges a vibration amount during a predetermined time after a predetermined movable operation key of the operation part is depressed or while a predetermined movable operation key is being pressed.

It is possible to restrict the amount of time during which the portable wireless terminal receives a vibration amount simply by adding a simple operation such as pressing or depressing a movable operation key, and it is possible to control with certainty an incidental attainments of the threshold of the vibration amount, that is, an incorrect activation different to that intended.

Another representative structure of the present invention is a portable wireless terminal which can establish communication with a contact destination terminal via a base station, including a vibration detection part which detects a vibration of the portable wireless terminal and obtains a vibration value, an alarm part which changes a luminescent color or voice according to a vibration amount calculated based on the detected vibration value and a time during which the vibration value exceeds a predetermined vibration value, an operation part arranged with a plurality of movable operation keys, and a transmission part which transmits to the contact destination terminal registered in the portable wireless terminal in the case where a predetermined movable operation key of the operation part is pressed or released when the alarm part emits a predetermined luminescent color or voice.

The present invention can easily transmit a critical state of a user while controlling a incorrect activation with certainty by changing luminescent color or voice in sequence according to a vibration amount calculated based on a detected vibration value and a time during which the vibration value exceeds a predetermined vibration value, and intuitive operating when the luminescent color or voice become a predetermined luminescent color or voice.

The portable wireless terminal may further comprise a warning part which issues a warning via the portable wireless terminal in the case where it is judged that the vibration amount has reached the predetermined threshold. Warning sound output, the transmission of the location position of the portable wireless terminal, emitting and flashing light are possible warnings of the warning part.

With this structure, it is possible not only to transmit to the contact destination terminal registered in the portable wireless terminal but also issue a warning to the portable wireless terminal itself and also issue a threat to an assailant and alarm to others nearby.

The alarm part may also issue an alarm to notify that transmission is complete. It is possible to provide a user with a sense of security with the structure of the alarm part which can understand that a contact destination terminal registered in advance has been transmitted to with certainty.

The alarm part may also issue an alarm to notify that the contact destination terminal has acknowledged the transmission. It is possible to provide a user with a further sense of security by transmitting to the registered contact destination terminal in advance and with the structure of the alarm part which can understand that transmission has been acknowledged with certainty.

Another representative structure of the present invention is a wireless communication method which transmits a state of a portable wireless terminal which can establish communication with a contact destination terminal via a base station to the contact destination terminal, the method including detecting vibration of the portable wireless terminal, judging whether or not a vibration amount calculated based on the detected vibration value and a time during which the vibration value exceeds a predetermined vibration value has reached a predetermined threshold, and transmitting to the contact destination terminal registered in the portable wireless terminal in the case where the vibration amount is judged to have reached the predetermined threshold.

Another representative structure of the present invention is a wireless communication method which includes an operation part arranged with a plurality of movable operation keys, and which transmits a state of a portable wireless terminal which can establish communication with a contact destination terminal via a base station, to the contact destination terminal, the method including detecting vibration of the portable wireless terminal, changing a luminescent color or voice according to a vibration amount calculated based on the detected vibration value and a time during which the vibration value exceeds a predetermined vibration value, and transmitting to the contact destination terminal registered in the portable wireless terminal in the case where a predetermined movable operation key of the operation part is pressed or released when the alarm part emits a predetermined luminescent color or voice.

The structural elements and their explanation based on the technological concept of the portable wireless terminal described above can also be applied to the wireless communication method.

Effects of the Invention

According to the present invention as explained above, it is possible to easily transmit a user's critical state with certainty by an intuitive operation which is not difficult to operate while being able to avoid incorrect activations.

BRIEF EXPLANATION OF THE DRAWINGS

FIG. 3 is a perspective view which shows the external appearance of a folding type portable wireless terminal.

EXPLANATION OF REFERENCE SYMBOLS

Figure 1:
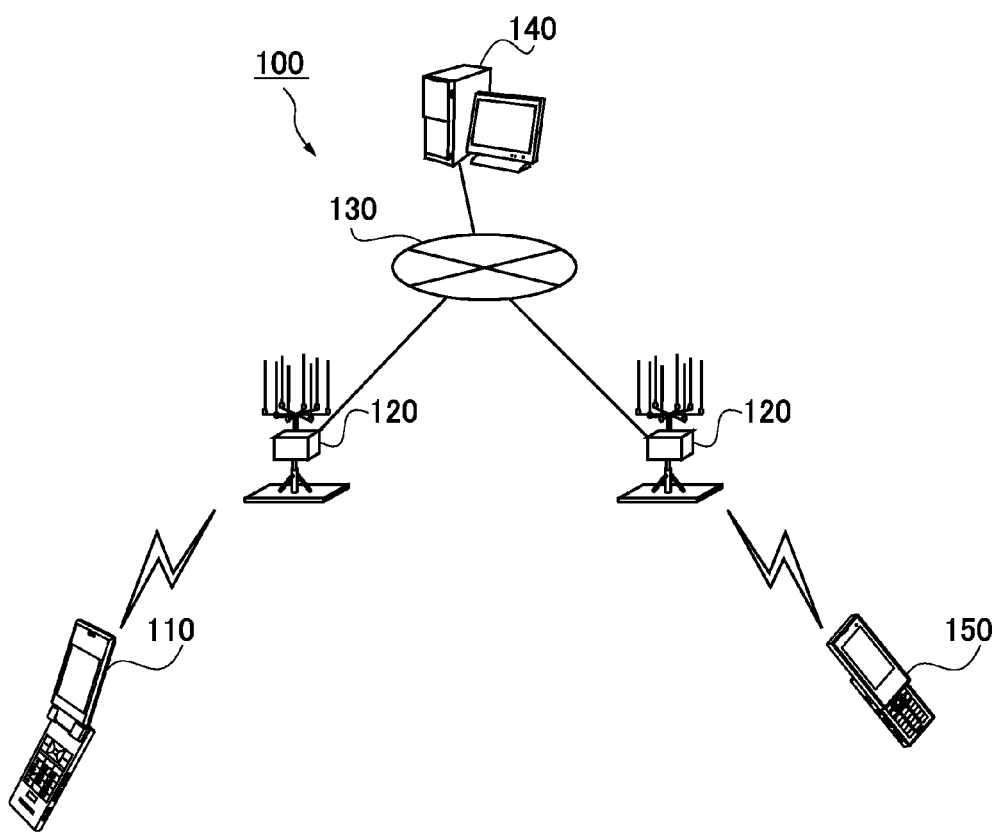
FIG. 1 is an explanation diagram which shows an approximate connection relationship of a wireless communication system.

100: wireless communication system
110: portable wireless terminal
150: contact destination terminal
216: operation part
218: light emitting part
222: voice output part
226: vibration detection part
228: movable operation key
230: vibration amount judgment part
232: transmission part

BEST EMBODIMENT FOR REALIZING THE INVENTION

The preferred embodiments of the present invention are explained in detail below while referring to the attached diagrams. The dimensions, materials and other specific numerical values are simply for exemplifying easy understanding of the invention and do not limit the invention. Furthermore, in the description of the invention and diagrams, overlapping explanations are omitted by attaching the same symbols to elements having essentially the same function and/or structure and elements which are not directly related to the present invention are omitted from the diagrams.

(Wireless Communication System 100)

FIG. 1 is an explanation diagram which shows an approximate connection relationship of a wireless communication system 100. The wireless communication system 100 is comprised of a portable wireless terminal 110, a base station 120 which establishes communication with the portable wireless terminal 110, a communication network 130 connected to the base station 120 and formed by an ISDN line (Integrated Services Digital Network), the Internet or dedicated line, a relay server 140 which relays each base station 120 via the communication network 130 and a contact destination terminal 150. Here, the contact destination terminal 150 refers to an electronic device held by a contact destination user such as a portable wireless terminal, fixed line telephone or personal computer.

In the wireless communication system 100 the portable wireless terminal 110 performs voice and data communication with another portable wireless terminal via wireless communication with a base station 120. In addition, the portable wireless terminal 110 can receive various services from a Web server (not shown in the diagram) from each service provider connected via the communication network 130. Specifically, in the present embodiment, it is possible to establish communication with the contact destination terminal 150 registered in the portable wireless terminal and transmit a critical state to the contact destination terminal 150 via the wireless communication system 100. A contact destination user who owns a contact destination terminal 150 receives this transmission and it is possible to rapidly execute safety measures which protect the user who owns the portable wireless terminal 110. Below, the detailed structure of the portable wireless terminal 110 which can transmit the state of a user by a simple operation is described. Subsequently, the wireless communication method of the portable wireless terminal 110 is described in detail.

(Portable Wireless Terminal 110)

Figure 2:
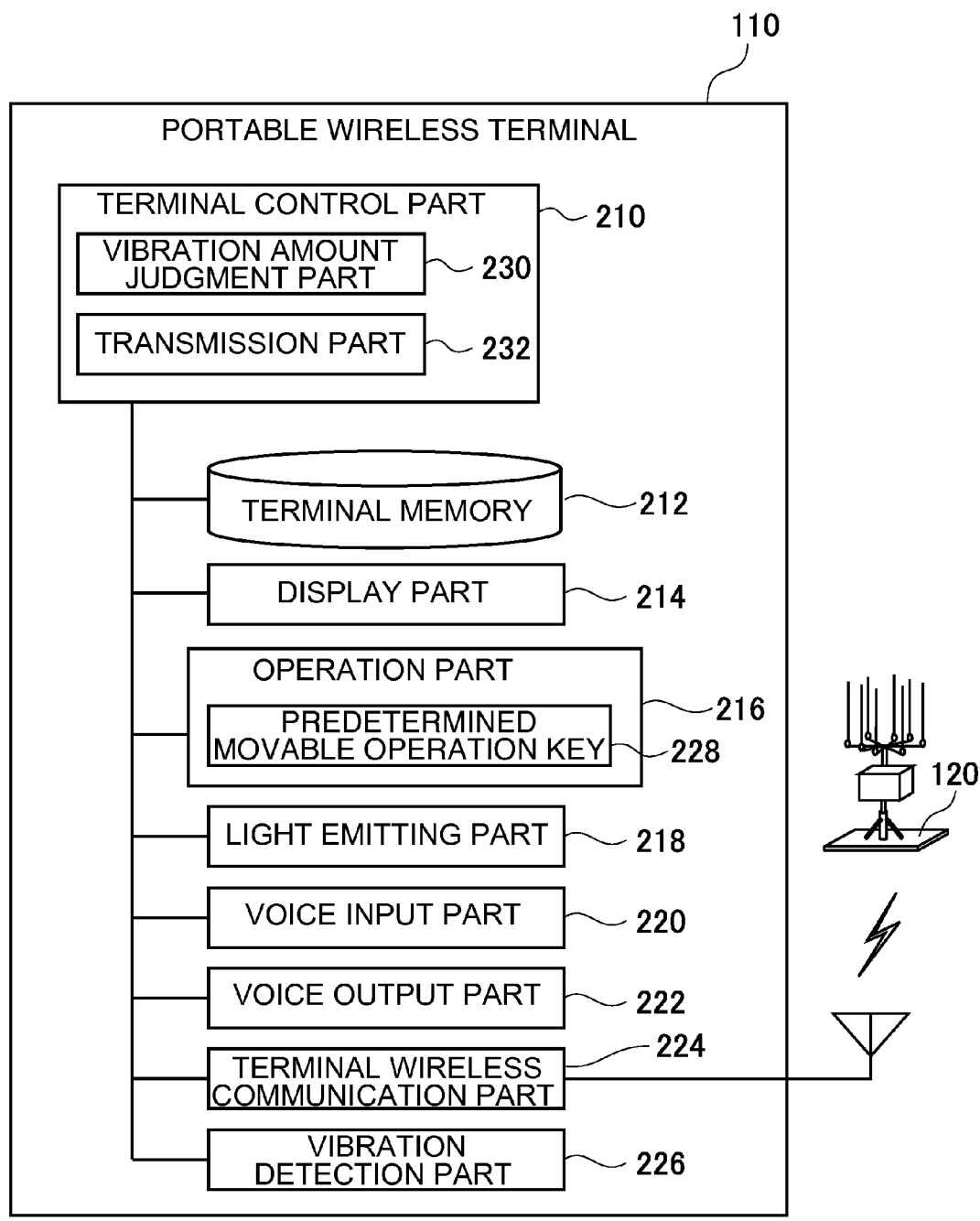
FIG. 2 is a functional block diagram which shows the hardware structure of a portable wireless terminal.

FIG. 2 is a functional block diagram which shows the hardware structure of the portable wireless terminal 110 and FIG. 3 is a perspective view which shows the external appearance of a folding type portable wireless terminal 110. In particular, FIG. 3A shows a folded state and FIG. 3 (*b*) shows an open state. The portable wireless terminal 110 is comprised of a terminal control part 210, a terminal memory 212, an display part 214, an operation part 216, a light emitting part 218, a voice input part 220, a voice output part 222, a terminal wireless communication part 224, and a vibration detection part 226.

The portable wireless terminal 110 may be various electronic devices which can perform wireless communication such as mobile phone, PHS terminal, note personal computer, PDA (Personal Digital Assistant), digital camera, music player, car navigation system, game console, and DVD player.

The terminal control part 210 manages and controls the entire portable wireless terminal 110 using a semiconductor integrated circuit which includes a central processing unit (CPU), and performs a phone call function, mail sending and receiving function, camera function, music playback function, TV viewing function using a program in the terminal memory 212. The terminal memory part 212 is formed of a ROM, RAM, EEPROM, nonvolatile RAM, flash memory, HDD etc and stores programs and communication data processed by the terminal control part 210.

The display part 214 is formed of a LCD (Liquid Crystal Display), EL (Electro Luminescence) etc and can display Web content and GUI (Graphical User Interface) of applications etc stored in the terminal memory 212 or provided by a web server via the communication network 130.

The operation part 216 is formed of a plurality of movable operation keys (hardware keys) such as a keyboard, cursor and joystick etc, and receive input from a user. In the present embodiment, in the operation part 216, a predetermined movable operation key (side key) 228 arranged on a casing side surface can become one judgment condition of the vibration amount judgment part 230 described below. The judgment conditions of the vibration amount judgment part 230 are described in detail below. While it is possible to use a predetermined movable operation key 228 as a dedicated key, it is generally used in combination with other functions. Here, the side key which is easy to press for a user is defined as the predetermined movable operation key 228. However, it is possible to change the allocation of predetermined movable operation keys according to user preferences.

The light emitting part 218 is formed of an LED (Light Emitting Diode), EL (Electro Luminescence) light emitters, sub LCD and other electronic parts which can illuminate. In particular, in the present embodiment, as is shown in FIG. 3A, two light emitting parts 218 which can produce a plurality of colors each occupy a light emitting region, for example, each light emitting part 218 can be independent according to a vibration input of a user and the colors produced can be changed. In addition, voice or vibration can be generated according to a change in the color produced and it is possible to confirm that produced color has change using voice or vibration.

Figure 4:
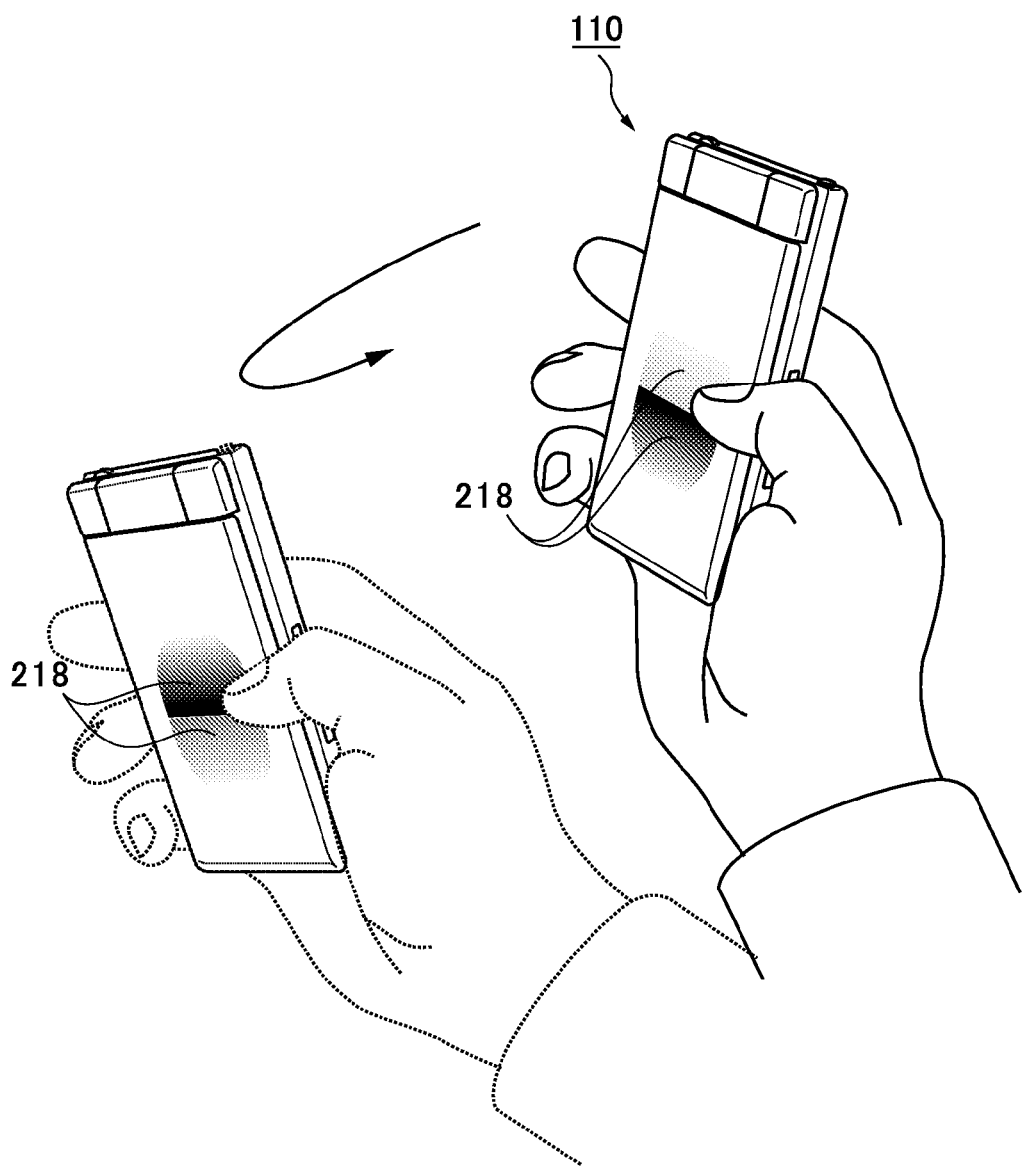
FIG. 4 is an explanation diagram which shows an operation process of user's vibration input.

FIG. 4 is an explanation diagram which shows an operation process of a user's vibration input. Here, when a user shakes the portable wireless terminal 110 as shown by the arrow in the diagram, the light emitting part 218 reacts and the produced color changes as is shown in FIG. 4 for each vibration cycle.

One example of an application which uses this type of change in produced color is an application which accesses a web server in a state in which an arbitrary color is selected via user input, and the user can receive different services (for example, color therapy which diagnoses a psychological state according to color) according to the access time and produced color.

In addition, the light emitting part 218 also functions as an alarm part and a warning part the same as the voice output part 222 described below. The specific functions of the alarm part and warning part are described in detail below.

The voice input part 220 is comprised of a voice recognition means such as a microphone and a user's voice input during a call is converted to electrical signals which can be processes within the portable wireless terminal 110. The voice output part 222 is comprised of a speaker and outputs the voice signal of a phone call partner received by the portable wireless terminal 110. In addition, it is possible to output incoming call notifications, operation sound of the operation part 216, or alarm ringtones and also functions as the alarm part and the warning part.

The terminal wireless communication part 224 establishes wireless communication with a base station 120 via a wireless communication system such as CDMA (Code Division Multiple Access) or WiMAX (Worldwide Interoperability for Microwave Access), and performs voice communication with a communication partner or data communication with a Web server.

The vibration detection part 226 is comprised of a vibration sensor, acceleration sensor, speed sensor and gravity sensor etc, detects vibration added to the portable wireless terminal itself and obtains a vibration value. The detection axis of this vibration may be a specific axis such as the length direction of the portable wireless terminal 110, or a scalar may be measured as an intersecting triple axis.

In addition, the terminal control part 210 described above functions as the vibration amount judgment part 230 and the transmission part 232.

The vibration amount judgment part 230 judges whether a vibration amount calculated based on a vibration value detected by the vibration detection part 226 and the time during which this detected vibration value exceeds a predetermined vibration value, has reached a predetermined threshold.

The portable wireless terminal 110 of the present embodiment can transmit its own critical state to a contact destination terminal 150 via vibration of the portable wireless terminal itself, that is, when a user shakes the portable wireless terminal 110. However, simply detecting vibration may cause an incorrect activation due to the vibration of a train or bus etc. Even if a threshold value is set as a vibration value which should solve this problem, the portable wireless terminal reacts to a sudden vibration value caused by dropping the portable wireless terminal.

Figure 5:
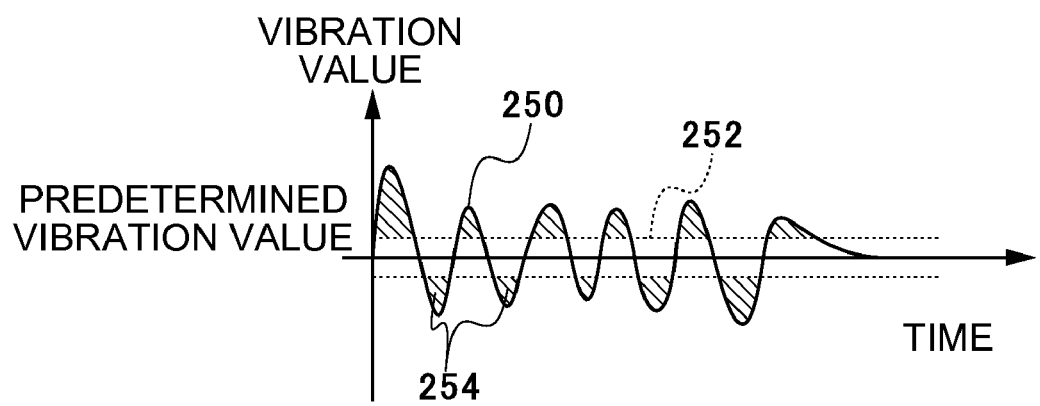
FIG. 5 is an explanation diagram for explaining the calculation of a vibration amount.

FIG. 5 is an explanation diagram for explaining the calculation method of a vibration amount. A time shift of the vibration value detected by the vibration detection part 226 is shown in FIG. 5. In the present embodiment, in order to solve the problem described above wherein only the vibration value is detected, an amount calculated based on a vibration value 250 detected by the vibration detection part 226 and the time during which the vibration value 250 exceeds a predetermined vibration value 252 is set as a vibration amount 254, that is, a value in which the area of parts shown by the diagonal line in FIG. 4 is accumulated. However, the concept of the vibration amount 254 is for example that it is possible to express even by the number of vibrations which exceed the predetermined vibration value 252 without relying on the area.

It is possible to control incorrect activation by the vibration of a train or bus etc by making the input which exceeds the predetermined vibration value 252 described above the object of detection, and it is possible to control incorrect activation due to an input of a sudden vibration value 250 caused by dropping the portable wireless terminal 110 by making this type of input a predetermined time requirement. A user can simply shake the portable wireless terminal 110 strongly for a few seconds in order to make the vibration amount 254 defined in this way reach the predetermined threshold (predetermined vibration value 252).

In the case where the vibration amount judgment part 230 judges that the vibration amount 254 has reached a predetermined threshold, the transmission part 232 transmits to the contact destination terminal 150 registered in the portable wireless terminal 110 in advance. It is possible to use various means to transfer information to the contact destination terminal, not only usual voice call transmission but also fixed phrase electronic mail decided in advance or TV call transmission.

It is possible to increase the vibration value 254 up to the predetermined threshold simply by shaking the portable wireless terminal 110 strongly for a few seconds. It is possible to easily transmit its own critical state with certainty by an intuitive operation which is not difficult to operate while being able to avoid incorrect activations.

In addition, in the case where a link function is arranged on the portable wireless terminal 110 of the present embodiment in which its own luminescent color is transmitted to the contact destination terminal 150 and the contact destination terminal 150 is made to emit the same luminescent color, it is possible to make the contact destination terminal 150 emit red light for example, a color that means exposed to danger, using this link function. In this way, the contact destination user who owns the contact destination terminal 150 can know a danger level.

At this time, the alarm part comprised by the light emitting part 218 and the voice output part 222 notifies the level at which the vibration amount 254 of the vibration amount judgment part 230 has attained the predetermined threshold using luminescent light or voice.

Figure 6:
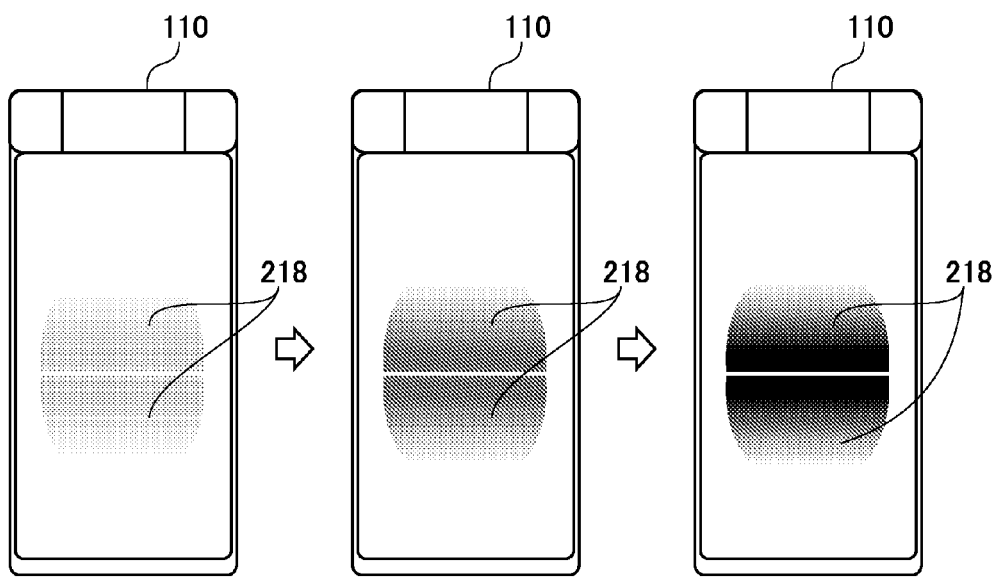
FIG. 6 is a state shift diagram of a portable wireless terminal for explaining the operation of an alarm part.

FIG. 6 is a state shift diagram of the portable wireless terminal 110 for explaining the operation of the alarm part. Here, the light emitting part 218 is used as the alarm part. Referring to FIG. 6, according to the accumulation of a user's vibration, that is, according to a vibration amount, the luminosity of the light (red for example) emitted by the light emitting part 218 becomes stronger as in FIGS. 6A, 6B and when it reaches a predetermined threshold, is latched by a maximum luminosity as in FIG. 6C.

In the present embodiment, it is possible to know the level of attainment during vibration of the portable wireless terminal 110, that is, between the initial vibration until the vibration amount 254 reaches the predetermined threshold, by a luminescent light emitted by the light emitting part 218 or voice emitted by the voice output part 222. Therefore, it is possible to not only know that the vibration amount 254 has reached the threshold but also guess during vibration how much shaking is required until the threshold can be reached, and adjust the vibration strength based on the degree of criticality.

In addition, it is possible to easily understand with certainty the level of attainment using the alarm part which can be recognized not by text or the number of light flashes but by luminescent light or voice while vibrating.

The alarm part also notifies that transmission is complete. It is also possible to provide a user with a sense of security by the structure of the alarm part which can understand that the contact destination terminal 150 registered in advance has been transmitted to with certainty.

The alarm part also notifies that the user who owns the contact destination terminal 150 has acknowledged that there was a transmission. It is also possible to provide a user with a sense of security by transmitting to the contact destination terminal 150 registered in advance and the structure of the alarm part which can understand that the contact destination terminal 150 registered in advance has been transmitted to with certainty.

In addition, the vibration amount judgment part 230 can judge a vibration amount by which the portable wireless terminal 110 is shaken within a predetermined period of time after pressing the predetermined movable operation key 228 of the operation part 216. In addition, the vibration amount by which the portable wireless terminal 110 is shaken can also be judged while the predetermined movable operation key 228 is depressed.

It is possible to restrict the period of time the portable wireless terminal 110 receives the vibration amount 254 just by adding a simple operation such as pressing or depressing a movable operation key. In this way, it is possible to avoid with certainty an incidental threshold attainment by vibration amount 254, that is, avoid an incorrect activation which is different to the one intended.

Furthermore, the warning part formed by the light emitting part 218 or voice output part 222, issues a warning via the portable wireless terminal itself in the case where it is judged that the vibration amount has reached a predetermined threshold. A transmission of the location of the portable wireless terminal calculated using GPS, a warning sound output from the voice output part 222, and light emitting or light flashing by the light emitting part 218 are examples of warning part.

With this structure it is possible to transmit not only to the contact destination terminal 150 but also issue a warning to the portable wireless terminal itself, and also issue a threat to an assailant and alarm to others nearby.

The portable wireless terminal 110 explained above, can easily transmit its own critical state with certainty by an intuitive operation which is not difficult to operate while being able to avoid incorrect activations.

(Wireless Communication Method)

Next, a wireless communication method which operates the portable wireless terminal 110 is explained.

Figure 7:
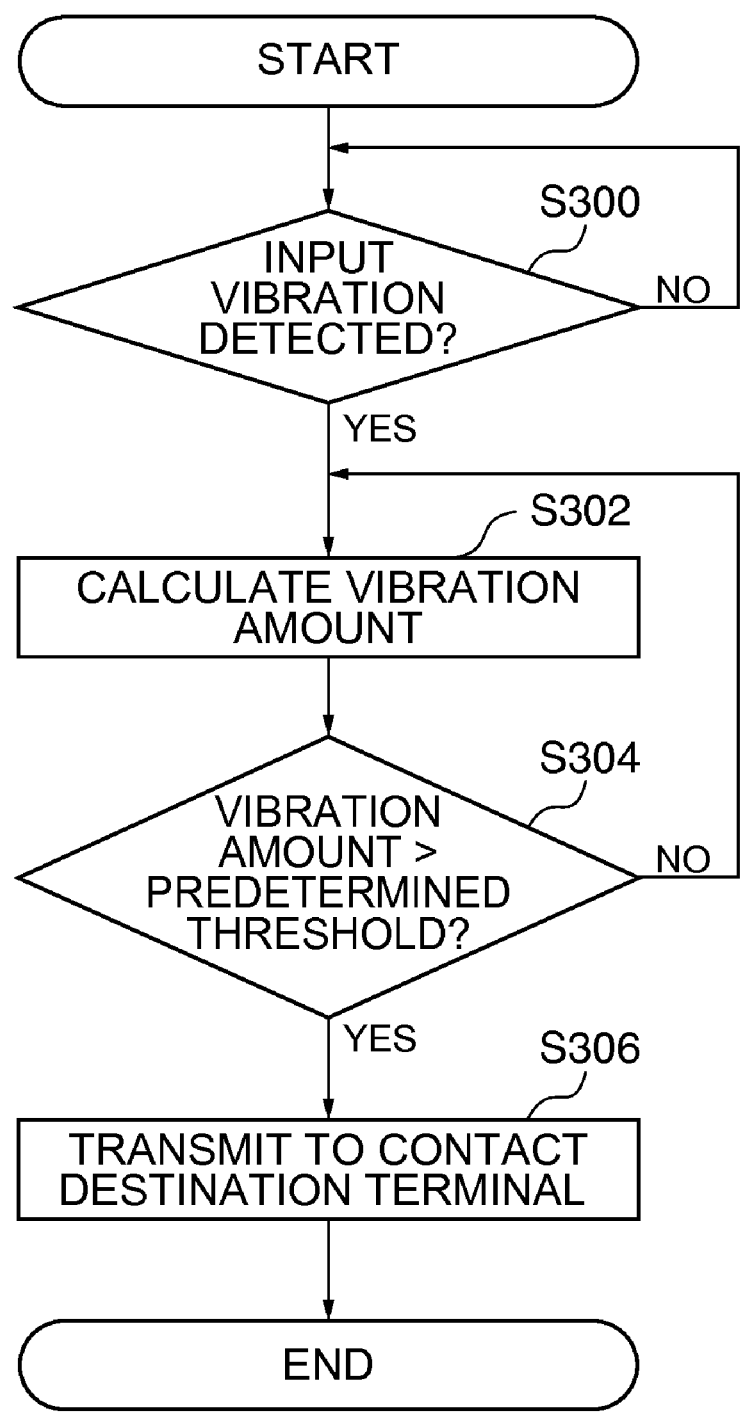
FIG. 7 is a flowchart which shows the entire flow of process of the wireless communication method.

FIG. 7 is a flowchart which shows the entire flow of process of the wireless communication method. In the case where a user is in danger, the user strongly shakes their portable wireless terminal 110 for a few second, for example three seconds. This time period (vibration amount) can be changed. When the portable wireless terminal 110 detects (S300) the user's input vibration, a vibration amount is calculated (S302) based on the detected vibration value and the time during which the vibration value exceeds a predetermined vibration value.

Next, the vibration amount judgment part judges (S304) whether the calculated vibration amount has reached a predetermined threshold value and in the case ("YES" in S304) where it is judged that the vibration amount has reached the predetermined threshold value, the critical state of the user is transmitted (S306) to the contact destination terminal 150 which is registered in advance. In the case where the vibration amount has not reached the predetermined threshold value ("NO" in S304), the vibration amount continues to be calculated (S302). Here, if the vibration input is not performed for a long period of time then it is not judged to be a critical time and is timed out.

Even with this type of wireless communication method it is possible for the portable wireless terminal to easily transmit its own critical state with certainty by an intuitive operation which is not difficult to operate while being able to avoid incorrect activations.

Second Embodiment

In the first embodiment described above, transmission to the contact destination terminal was performed in the following sequence [portable wireless terminal vibration→light emitting part luminescent light color change] or [movable operation key press→portable wireless terminal vibration→light emitting part luminescent light color change]. In the second embodiment, recognizes the luminescent light color from the light emitting part 218 and transmission timing is calculated is added to [movable operation key press→portable wireless terminal vibration→light emitting part luminescent light color change].

Because the second embodiment can be performed with a similar structure as the first embodiment, an explanation of the structure already described in the first embodiment is omitted and only the differences in operation are explained.

Figure 8A:
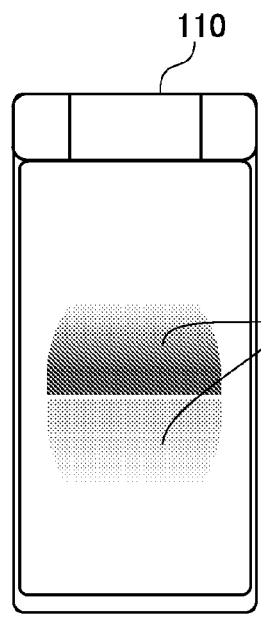
FIGS. 8A, 8B and 8C are state shift diagrams of a portable wireless terminal for explaining the operation of an alarm part and transmission part.
Figure 8B:
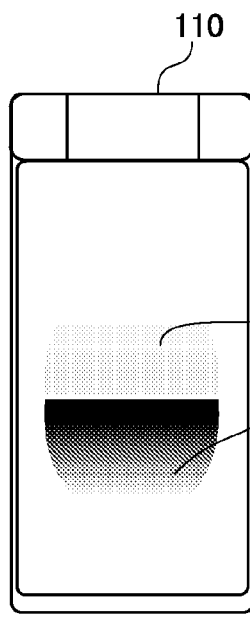
Figure 8C:
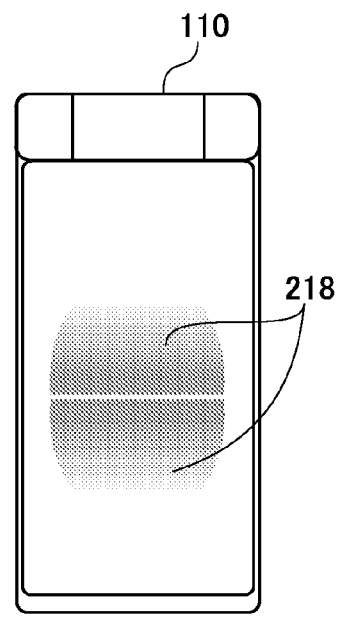

FIGS. 8A, 8B and 8C are state shift diagrams of a portable wireless terminal 110 for explaining the operation of an alarm part and transmission part 232. Here, the light emitting part 218 is used as the alarm part. In the portable wireless terminal 110 in the second embodiment, the vibration detection part 226 detects vibration of the portable wireless terminal 110 itself, and when a vibration value is obtained the light emitting part 218 changes the color of the light it emits as is shown in FIGS. 6A, 6B according to a vibration amount calculated based on the vibration value detected by the vibration detection part 226 and the time during which the vibration value exceeds a predetermined vibration value.

Then, when a user presses or releases a predetermined movable operation key 228 when two light emitting part 218 show both predetermined luminescent lights (yellow for example), the transmission part 232 transmits to the contact destination terminal 150 via the operation part 216.

In the present embodiment, luminescent light or voice is changed in sequence according to a vibration amount calculated based on the detected vibration value and the time during which the vibration value exceeds a predetermined vibration value. In addition, when the luminescent light or voice becomes a predetermined luminescent light or voice set in advance, it is possible to control incorrect activation with certainty and easily transmit a critical state of a user by an intuitive operation.

While the preferred embodiments of the present invention are explained above while referring to the diagrams, the present invention is not limited to these examples. It is clear that a person skilled in the art may make changes and modifications without departing from the scope of the appended claims and it is to be understood that such changes are within the technical scope of the present invention.

Furthermore, in each process in the wireless communication method of the present specification, it is not always necessary to perform the processes in a time sequence following the sequence described in the flowchart. The processes may be performed in parallel or in subroutine.

INDUSTRIAL APPLICABILITY OF THE INVENTION

The present invention can be used for a portable wireless terminal which can display a plurality of pixels arranged in lines, and a wireless communication method.

What is claimed is:

1. A portable wireless terminal which can establish communication with a contact destination terminal via a base station comprising:
    a vibration detection part which detects a vibration of the portable wireless terminal and obtains a vibration value;
    a vibration amount judgment part which judges whether or not a vibration amount calculated based on the detected vibration value and a time during which the vibration value exceeds a predetermined vibration value has reached a predetermined threshold; and
    a transmission part which transmits to the contact destination terminal registered in the portable wireless terminal in the case where the vibration amount is judged to have reached the predetermined threshold.

2. The portable wireless terminal according to claim 1, further comprising:
    an alarm part which notifies by a luminescent color or voice the degree of attainment, to the predetermined threshold, of the vibration amount in the vibration amount judgment part.

3. The portable wireless terminal according to claim 1, further comprising:
    an operation part arranged with a plurality of movable operation keys;
    wherein
    the vibration amount judgment part judges a vibration amount during a predetermined time after a predetermined movable operation key of the operation part is depressed or while the predetermined movable operation key is being pressed.

4. A portable wireless terminal which can establish communication with a contact destination terminal via a base station comprising:
- a vibration detection part which detects a vibration of the portable wireless terminal and obtains a vibration value;
- an alarm part which changes a luminescent color or voice according to a vibration amount calculated based on the detected vibration value and a time during which the vibration value exceeds a predetermined vibration value;
- an operation part arranged with a plurality of movable operation keys; and
- a transmission part which transmits to the contact destination terminal registered in the portable wireless terminal in the case where a predetermined movable operation key of the operation part is pressed or released when the alarm part emits a predetermined luminescent color or voice.

5. The portable wireless terminal according to claim 1, further comprising:
- a warning part which issues a warning via the portable wireless terminal in the case where it is judged that the vibration amount has reached the predetermined threshold.

6. The portable wireless terminal according to claim 1, wherein the alarm part issues an alarm to notify that transmission is complete.

7. The portable wireless terminal according to claim 1, wherein the alarm part issues an alarm to notify that the contact destination terminal has acknowledged the transmission.

8. A wireless communication method which transmits a state of a portable wireless terminal which can establish communication with a contact destination terminal via a base station to the contact destination terminal comprising:
- detecting vibration of the portable wireless terminal;
- judging whether or not a vibration amount calculated based on the detected vibration value and a time during which the vibration value exceeds a predetermined vibration value has reached a predetermined threshold; and
- transmitting to the contact destination terminal registered in the portable wireless terminal in the case where the vibration amount is judged to have reached the predetermined threshold.

9. A wireless communication method which includes an operation part arranged with a plurality of movable operation keys, and which transmits a state of a portable wireless terminal which can establish communication with a contact destination terminal via a base station, to the contact destination terminal comprising:
- detecting vibration of the portable wireless terminal;
- changing a luminescent color or voice according to a vibration amount calculated based on the detected vibration value and a time during which the vibration value exceeds a predetermined vibration value; and
- transmitting to the contact destination terminal registered in the portable wireless terminal in the case where a predetermined movable operation key of the operation part is pressed or released when the alarm part emits a predetermined luminescent color or voice.

* * * * *